United States Patent [19]

Ezawa et al.

[11] Patent Number: 5,437,416

[45] Date of Patent: Aug. 1, 1995

[54] WINDING/REWINDING APPARATUS AND METHOD FOR A CAMERA

[75] Inventors: Akira Ezawa, Tokyo; Koichi Daitoku, Sagamihara; Tsutomu Wakabayashi, Tokyo, all of Japan

[73] Assignee: Nikon Corporation, Tokyo, Japan

[21] Appl. No.: 312,677

[22] Filed: Sep. 28, 1994

Related U.S. Application Data

[63] Continuation of Ser. No. 190,572, Feb. 2, 1994, abandoned, which is a continuation of Ser. No. 810,118, Dec. 19, 1991, abandoned, which is a continuation-in-part of Ser. No. 599,830, Oct. 29, 1990, abandoned.

[30] Foreign Application Priority Data

| Oct. 26, 1989 | [JP] | Japan | 1-279560 |
| Mar. 30, 1990 | [JP] | Japan | 2-084587 |
| Dec. 26, 1990 | [JP] | Japan | 2-414372 |

[51] Int. Cl.6 .................................................. G03B 1/04
[52] U.S. Cl. ........................ 242/356.60; 242/348.40; 354/173.10; 354/212
[58] Field of Search ................. 354/173.1, 212, 214; 242/71.1, 71, 71.6, 348, 40, 356.60

[56] References Cited

U.S. PATENT DOCUMENTS

| 4,497,555 | 2/1985 | Akiyama | 354/212 X |
| 4,589,604 | 5/1986 | Yagi et al. | 242/71.6 |
| 4,610,522 | 9/1986 | Tobioka et al. | 354/173.1 |
| 4,688,763 | 8/1987 | Wakabayashi et al. | 354/214 X |
| 4,724,450 | 2/1988 | Miyawaki et al. | 354/214 X |
| 4,832,275 | 5/1989 | Robertson | 242/71.1 |
| 4,834,306 | 5/1989 | Robertson et al. | 242/71.1 |

FOREIGN PATENT DOCUMENTS

| 0228093 | 7/1987 | European Pat. Off. | |
| 105729 | 7/1982 | Japan | 354/214 |
| 0105729 | 7/1982 | Japan | 354/214 |
| 0112735 | 7/1982 | Japan | 354/214 |
| 112735 | 7/1982 | Japan | 354/214 |
| 83829 | 5/1983 | Japan | 354/214 |
| 0083829 | 5/1983 | Japan | 354/214 |
| 1-25938 | 8/1989 | Japan | |

Primary Examiner—Daniel P. Stodola
Assistant Examiner—William Stryjewski
Attorney, Agent, or Firm—Shapiro and Shapiro

[57] ABSTRACT

A winding/rewinding apparatus for a camera comprises a winding spool on which a film advanced thereto is wound when the winding spool rotates; a rewinding shaft for engaging a spool of a film cartridge loaded into the camera so as to rotate the spool; a motor; a transmission for transmitting the drive force of the motor to the winding spool and the rewinding shaft so as to advance the film from the cartridge to the winding spool, the transmission transmitting the drive force of the motor so that a speed at which the film is advanced by the rewinding spool is higher than a speed at which the film is advanced by the rewinding shaft; and a clutch which disengages so as not to transmit the drive force of the motor to the rewinding shaft when the rewinding shaft is driven at an increased speed by the film which is being wound by the winding spool.

17 Claims, 3 Drawing Sheets

WINDING/REWINDING APPARATUS AND METHOD FOR A CAMERA

This is a continuation of application Ser. No. 08/190,572 filed Feb. 2, 1994 (now abandoned), which is a continuation of application Ser. No. 07/810,118 filed Dec. 19, 1991, (abandoned), which is a continuation-in-part of application Ser. No. 07/599,830 filed Oct. 19, 1990, (abandoned).

BACKGROUND OF THE INVENTION

1. Field of the Invention

The present invention relates to an automatic film winding/rewinding apparatus for a still camera in which a cartridge containing a roll type film is loaded.

2. Related Background Art

U.S. Pat. No. 4832275 and U.S. Pat. No. 4834306 propose a cartridge of a different construction from currently available type-135 cartridges. The cartridge proposed by the above U.S. Patents has a film whose leader portion is not extending to the outside of the cartridge but is extruded to the outside when the spool is rotated after the cartridge has been loaded into the camera.

Thus, this type of film cannot be advanced properly when loaded into a camera which is designed to be loaded a conventional type-135 film cartridge.

SUMMARY OF THE INVENTION

An object of the present invention is to provide a film winding/rewinding apparatus for a still camera using a thrust-type film unit in which the cartridge proposed by the above U.S. Patents is loaded, advanced, and rewound.

In accordance with one of its principal aspects the present invention provides a winding and rewinding apparatus comprising a winding spool on which the leading portion of a film advanced thereto is wound when said winding spool rotates, and a rewinding shaft rotated by the film after the leading portion of the film has been caught by the winding spool.

The apparatus may comprise a reversible motor and transmission means for transmitting forward rotational force of the motor to the rewinding shaft and to the winding spool such that the rewinding shaft rotates to advance a portion of the film to the winding spool and the winding spool thereafter winds the film thereon, with the film winding speed of the winding spool being greater than the film advancing speed of the rewinding shaft. The transmission means may include clutch means having an engaged state for transmitting forward rotational force of the motor to the rewinding shaft, and disengaging in response to an increase in the rewinding shaft speed due to the winding of the film by the winding spool, thereby discontinuing the transmission of forward rotational force of the motor to the rewinding shaft when the film is being wound by the winding spool.

According to the present invention, after the film is loaded, the forward rotation of the motor drives the rewinding shaft in a forward direction to advance the film. This allows the rewinding shaft to advance the leader portion of the film to the outside of the cartridge until the leader portion is wound by the winding spool, whereafter the clutch means is disengaged by the resulting increase in speed of the rewinding shaft. As a result, the transmission of the forward rotational force from the motor to the rewinding shaft is discontinued.

As will be evident, the present invention provides a simple mechanism which accomplishes the operations of advancing and winding the film, and which also enables subsequent rewinding of the film.

BRIEF DESCRIPTION OF THE DRAWINGS

The above and other objects and features of the present invention will be more apparent from the detailed description of the preferred embodiments with reference to the accompanying drawings in which.

DESCRIPTION OF THE PREFERRED EMBODIMENTS

Figure 1:
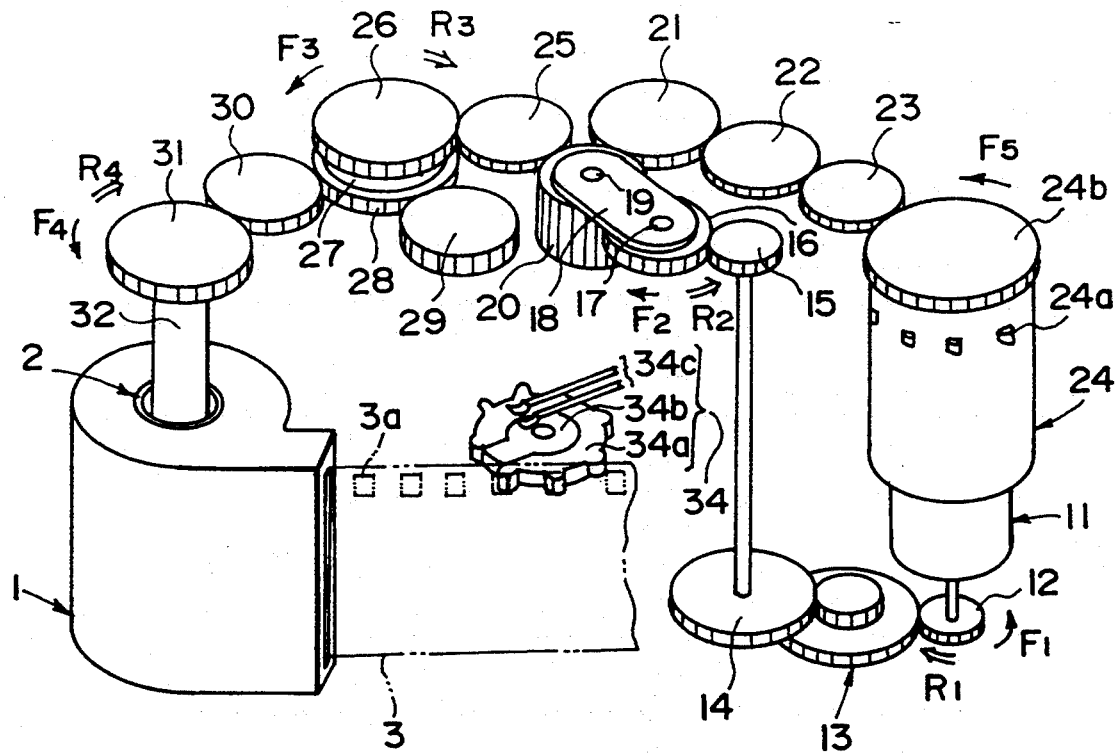
FIG. 1 is a perspective view of a first embodiment of the invention.

FIG. 1 shows a first embodiment of the present invention. In the figure, a film 3 is wrapped around a cartridge spool 2 within a cartridge 1. The film 3 has perforations 3a at an upper portion thereof. A spool 24 of a camera is provided with a set of teeth 24a and a gear 24b that rotates integrally with the teeth 24a. The rotation of a motor housed in the spool 24 is transmitted to a sun gear 16 through a pinion 12, a reduction gear 13, and gears 14 and 15. The sun gear 16 is adapted to rotate about a sun shaft 17 and an arm 18 is adapted to pivot about the sun shaft 17. Between the arm 18 and the sun shaft 17 is interposed a friction spring (not shown) which provides the arm and shaft with a friction therebetween. Thus, the arm 18 pivots in the same direction that the sun gear 16 rotates. A planetary gear 20 in mesh with the sun gear 16 is rotatably mounted on the shaft 19 on the arm 18, thus constructing a planetary gear mechanism together with the arm 18 and the sun gear 16. When the sun gear 16 rotates in the direction of $F_2$, the planetary gear 20 moves into meshing engagement with both gears 21 and 25 with the aid of the pivotal motion of arm 18. The gear 21 drives a gear 24b into rotation through gears 22 and 23. The gear 25 is in mesh with a gear 26 which is connected to a gear 28 via a one way clutch 27. The rotation of the gear 28 is transmitted to a rewinding gear 31 through a gear 30. The rewinding gear 31 in turn causes a fork 32 to rotate together. The fork 32 engages the key of cartridge spool 2 when the cartridge is loaded into the camera. When the sun gear 16 rotates in the direction of $R_2$, the planetary gear 18 pivots to mesh with a gear 29 so that the rotation of the sun gear 16 is transmitted to the gear 31 through the gears 28 and 30.

Figure 2:
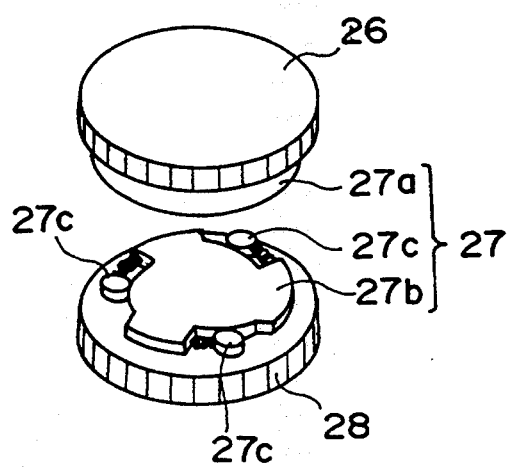
FIG. 2 is an exploded perspective view of a one-way clutch 27 in FIG. 1.

The clutch 27, as shown in FIG. 2, is of a camroller type formed of a cam 27b, rollers 27c, and outer sleeve 27a. The cam 27b is made in one piece with the gear 28 and the outer sleeve 27a integrally continuous with the gear 26. The rollers 27c are each urged by springs counterclockwise. The gears 26 and 28 are disengaged from each other when the gear 28 rotates counterclockwise relative to the gear 26 when seen from above in FIG. 2, and are engaged when the gear 28 rotates clockwise.

A sprocket 34a engages the perforations 3a and rotates when the film 3 is advanced. The sprocket 34a, a pattern 34b, and brushes 34c form an encoder 34.

The operation of an embodiment of the above-described construction will now be described below.

When the cartridge 1 is loaded into the camera, the fork 32 engages the cartridge spool 2. At this time, the film 3 has not been drawn yet from the cartridge 1. In response to a signal generated by the closure of a back lid (not shown) or a half-press operation of a release button (first-stage press of a two-stage press whose second-stage causes the shutter to trip), an electric circuit (not shown) causes a motor 11 to rotate in the direction of $F_1$, causing the sun gear 16 to rotate in the direction of $F_2$. Therefore, the arm 18 also pivots in the direction of $F_2$ so that the planetary gear 20 meshes with both the gears 21 and 25. The rotation of the gear 21 causes the spool 24 to rotate in the direction of $F_5$ while the rotation of the gear 25 causes the gear 26 to rotate in the direction of $F_3$. This permits the one way clutch 27 to engage so that the rewinding-gear 31 is driven through the gears 28 and 30 to rotate in the direction of $F_4$. Thus, the fork 32 drives the cartridge spool 2 to rotate in the direction of $F_4$, so that the leading portion of the film 3 is extruded to the outside of the cartridge 1, passes by the aperture (not shown), and extends above the spool 24. Up to this stage of the operation, both the spool 24 and the fork 32 are rotated in the same direction, but since the gear ratios are selected so that as soon as the perforations 3a of the film 3 engage the teeth 24a and the film 3 is wound around the spool 24, the spool 24 winds the film 3 off the cartridge 1 faster than the fork 32 advances the film 3. Thus, the cartridge spool 2 is caused by the film 3 to rotate faster than the fork 32 driven by the motor 11. Accordingly, the rewinding gear 31, gears 30 and 28 are rotated faster than the motor 11, so that the gear 28 rotates counterclockwise relative to the gear 26 allowing the one way clutch 27 to disengage. Thus, the gears 26 and 28 continue to rotate at different speeds. When the electric circuit (not shown) provides a signal indicative that the film 3 has advanced by a desired amount, the motor 11 is stopped. This completes the initial winding so that the first frame is positioned opposite to the exposure aperture. Thereafter, the electric circuit causes the motor 11 to rotate in the direction of $F_1$ to advance the film 3 by one frame when the film is exposed by a shutter or a release operation. The electric circuit controls the motor 11 to stop when the electric circuit receives from the encoder 34 a signal representative of one-frame-advancement of the film 3.

When all the frames are exposed in this manner, the electric circuit (not shown) controls the motor 11 to rotate in the direction of $R_1$, i.e., in the reverse direction. This causes the sun gear 16 to rotate in the direction of $R_2$ together with the arm 18 causing the planetary gear 20 to move out of engagement with the gears 21 and 25 but instead to move into engagement with the gear 29. Thus, the rotation of the gear 29 is transmitted to the rewinding gear 31 through the gears 28 and 30 to cause the cartridge spool 2 to rotate in the direction of $R_4$, allowing the cartridge 1 to rewind the film 3.

At this time, the gear 28 rotates clockwise relative to the gear 26, so that the one way clutch 27 moves into engagement. Thus the gear 26 is driven into free rotation together with the gear 25. The spool 24 is also driven into free rotation when the entire film 3 has returned into the cartridge 1.

When the whole film 3 has been received back into the cartridge 1, the encoder 34 stops outputting the signals and therefore the electric circuit detects no signal from the encoder 34 and stops the motor 11.

Figure 3:
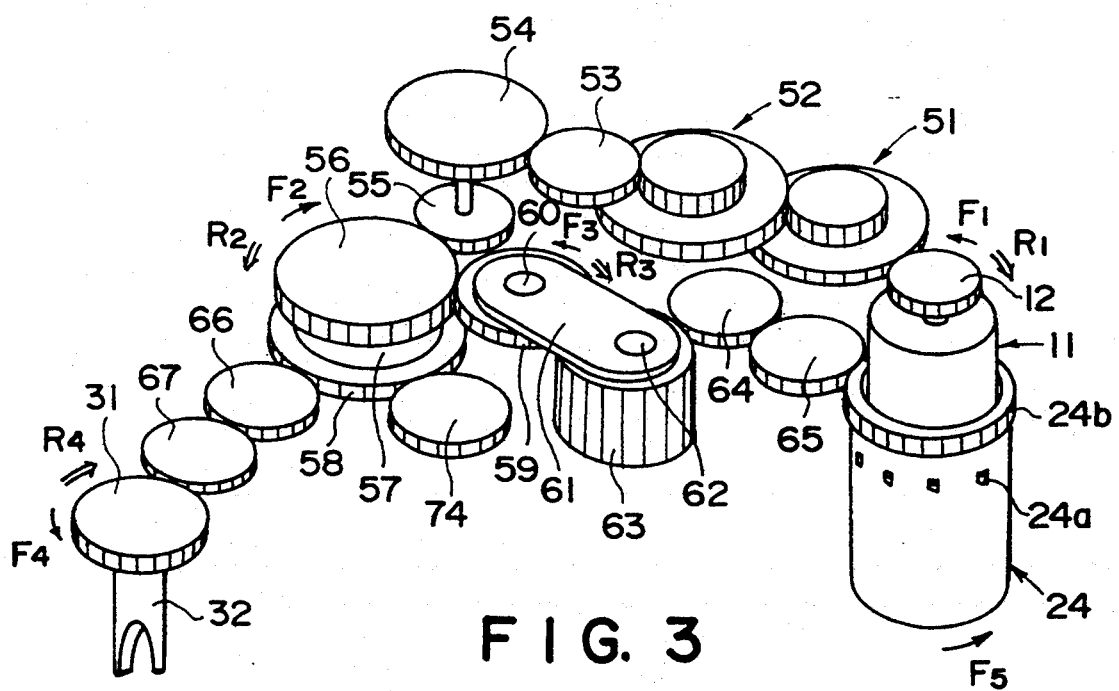
FIG. 3 is a perspective view of a second embodiment.

FIG. 3 shows a second embodiment of the present invention, where the cartridge 1 containing the film 3 and the encoder 34 are the same as those in the first embodiment and are therefore not shown. The same elements as in the first embodiment have been given the same reference numerals and the detailed description thereof are omitted.

The rotation of the motor 11 is transmitted to a gear 56 through reduction gears 51, 52, 54, and 55 and a gear 53. A sun gear 59 in mesh with the gear 56 is adapted to rotate about a sun shaft 60 and forms a planetary gear mechanism together with an arm 61, a planetary shaft 62, a planetary gear 63 and a spring (not shown) interposed between the sun gear 59 and the arm 61. When the gear 56 rotates in the direction of $F_2$, the sun gear 59 rotates in the direction of $F_3$ so that the planetary gear 63 moves into meshing engagement with a gear 64 through the pivotal motion of the arm 61 to thereby transmit rotation to the gear 24b through the gear 65. The gear 56 is connected to a gear 58 through a one way clutch 57 and causes the gear 31 to rotate through gears 66 and 67. When the gear 56 rotates in the direction of $R_2$, the sun gear 59 rotates in the direction of $R_3$, so that the arm 61 permits the planetary gear 63 to mesh with the gear 74 to transmit rotation to the gear 58.

The one way clutch 57 operates to engage and disengage in the direction opposite to the first embodiment; it engages when the gear 58 rotates counterclockwise relative to the gear 56 seen from above in FIG. 3, and disengages when the gear 58 rotates clockwise.

The operation of an apparatus of thus described construction will be described below.

When the cartridge 1 has been loaded into the camera, the fork 32 engages the cartridge spool 2. Then, in response to a signal generated by, for example, the closure of a back lid (not shown), an electric circuit (not shown) causes a motor 11 to rotate in the direction of $F_1$ causing the fork 32 to rotate in the direction of $F_4$ and the spool 24 in the direction of $F_5$. Since the gear ratios are selected so that the spool 24 winds the film 3 off the cartridge 1 faster than the fork 32 advances the film 3, when the leading portion of the film 3 arrives at the spool 24 and is then wound therearound, the gear 58 rotates faster than the gear 56 in the direction of $F_2$ causing the one way clutch 57 to move out of engagement. When all the frames have been exposed by exposing each frame and subsequently winding up each frame following the initial winding operation, the motor 11 rotates in the direction of $R_1$ causing the planetary gear 63 to disengage the gear 64 and instead to engage the gear 74 to drive the gear 58 into rotation. The gear 58 has slightly more teeth than the gear 56, while gears 59, 63, and 74 have the same number of teeth, and therefore, the gear 58 rotates in the direction of $R_2$ slightly slower than the gear 56. While both the gears 56 and 58 actually rotate counterclockwise, the gear 58 rotates clockwise relative to the gear 56. This allows the one way clutch 57 to disengage. Thus, the rotation of the motor 11 in the direction of $R_1$ is transmitted to the fork 32 through the gear 56, sun gear 59, planetary gear 63, gear 74, and gear 58 so that the film 3 is rewound into the cartridge 1.

Figure 4:
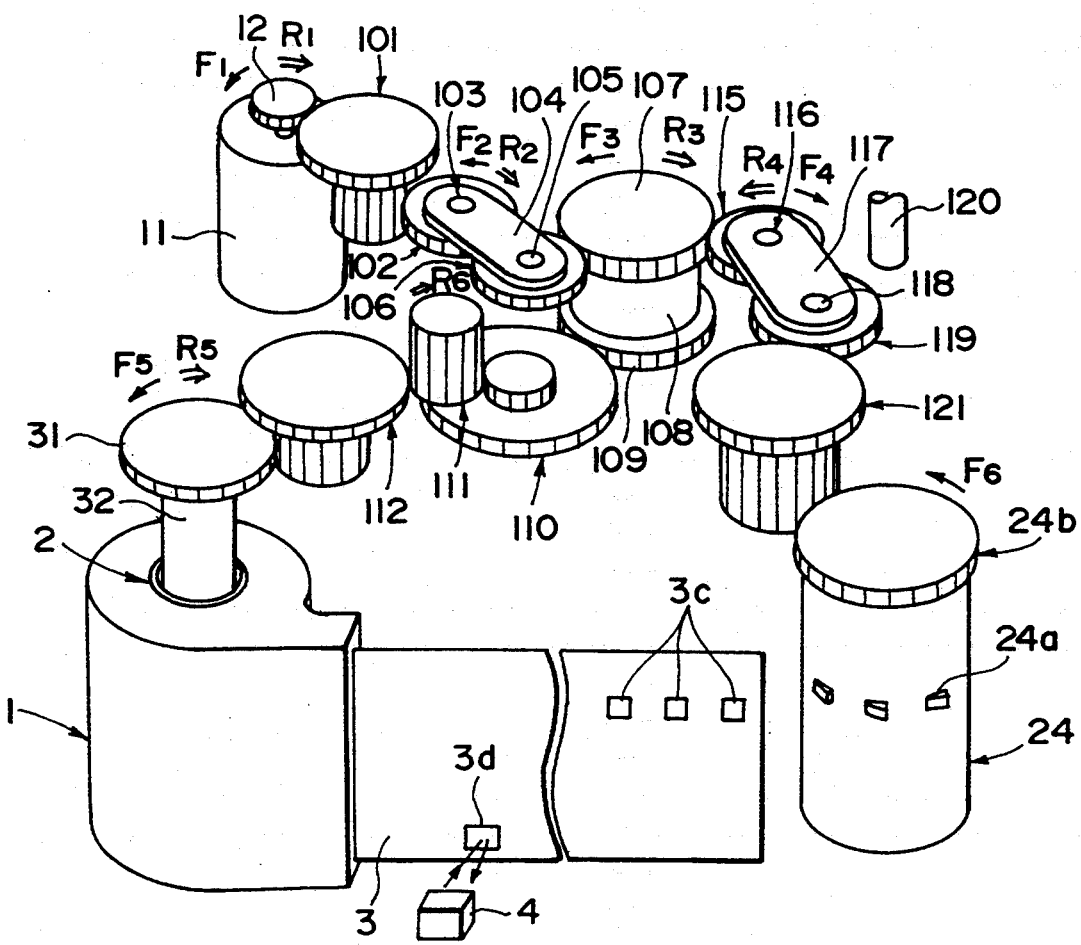
FIG. 4 is a perspective view of a third embodiment.

FIG. 4 illustrates a third embodiment of the present invention. The film 3 is formed with traction holes 3c at its end portion. The spool 24 has teeth 24a on which the traction holes 3c are fitted and a spool gear 24b which rotates integrally with the spool 24. The film 3 is formed with perforations 3d therein indicating the positions of respective frames which are detected by a photosensor 4 when passing across the photosensor, thus advancing one frame after another.

The rotation of the motor 11 is transmitted to a first sun gear 102 through the pinion 12 and a reduction gear 101. The first sun gear 102 is rotatable about a fixed sun shaft 103. The first sun gear 102, an arm 104, a friction spring (not shown) interposed between the first sun gear 102 and the arm 104, a planetary shaft 105, and a first planetary gear 106 form a planetary mechanism.

When the motor 11 rotates in the direction of $F_1$ to cause the first sun gear 102 to rotate in the direction of $F_2$, the first planetary gear 106 engages the gear 107 in meshing relation to cause the gear 107 to rotate in the direction of $F_3$. The rotation of the gear 107 is transmitted to the gear 109 which in turn transmits the rotation to the rewinding gear 31 through the reduction gear 110, gear 111, and reduction gear 112 so that the rewinding gear 31 rotates together with the fork 32 in the direction of $F_5$. The gear 107 is in mesh with a second sun gear 115 which is rotatable about a sun shaft 116 and forms a planetary gear mechanism together with an arm 117, a friction spring interposed between the second sun gear 115 and the arm 117, a planetary shaft 118, and a second planetary gear 119.

When the rotation of gear 107 in the direction of $F_3$ causes the second sun gear 115 to rotate in the direction of $F_4$, the second planetary gear 119 moves into meshing engagement with the reduction gear 121 to cause the spool gear 24b to rotate, and therefore the spool 24 to rotate, in the direction of $F_6$.

When the motor 11 rotates in the direction of $R_1$ to drive the first sun gear 102 into rotation in the direction of $R_2$, the first planetary gear 106 moves into meshing engagement with the gear 111 to cause the fork 32 to rotate in the direction of $R_5$ through the reduction gear 112 and rewinding gear 31. At the same time, the rotation of gear 111 causes the gear 109 to rotate in the direction of $R_3$ through the gear 110. The rotation of the gear 109 is transmitted by the one way clutch 108 to the gear 107 so that the gear 107 rotates in the direction of $R_3$. This causes the second sun gear 115 to rotate in the direction of $R_4$ permitting the arm 117 to pivot counterclockwise till the arm 117 abuts the limit pin 120. Thus, the second planetary gear 119 moves out of meshing engagement with the reduction gear 121.

The one way clutch 108 engages and disengages in the same direction as in the first embodiment. Seen from above in FIG. 4, the clutch disengages when the gear 109 rotates counterclockwise relative to the gear 107, and engages when the gear 109 rotates clockwise.

The operation of the third embodiment will now be described.

After the cartridge 1 is loaded into the camera, the fork 32 engages the cartridge spool 2. Then, in response to a signal generated by, for example, the closure of a back lid, an electric circuit (not shown) controls the motor 11 to rotate in the direction of $F_1$. Thus, the first sun gear 102 rotates in the direction of $F_2$ allowing the first planetary gear 106 to move into meshing engagement with the gear 107, which in turn rotates in the direction of $F_3$ causing the one way clutch 108 to engage. This allows the one way clutch 108 to drive the rewinding gear 31 into rotation in the direction of $F_5$. Thus, the fork 32 drives the cartridge spool 2 into rotation in the direction of $F_5$ extruding the leading portion of the film 3 so that the film 3 is advanced to the spool 24. The rotation of the gear 107 in the direction $F_3$ causes the second sun gear 115 to rotate in the direction of $F_4$ allowing the second planetary gear 119 to move into meshing engagement with the reduction gear 121 which in turn causes the spool 24 to rotate in the direction of $F_6$. In this embodiment, too, since the gear ratios are selected so that the spool 24 winds the film 3 off the cartridge 1 faster than the fork 32 advances the film 3, the cartridge spool 2 is rotated faster than is driven by the motor 11 through the fork 32 as soon as the leading portion of the film 3 arrives at the spool 24 and engages the teeth 24a through the traction hole 3c to be wound therearound. Thus, the rewinding gear 31, reduction gear 112, gear 111, reduction gear 110 and gear 109 are also rotated by the film 3 faster than are driven by the motor 11. Thus, the gear 109 rotates counterclockwise relative to the gear 107 allowing the one way clutch 108 to disengage, and thus the gear 109 and 107 rotate at different speeds. When the photosensor detects the perforation 3d indicative of the first frame, the electric circuit controls the motor 11 to stop. This completes the initial winding (advancing a non-exposed frame). Thereafter, after each frame is exposed by tripping the shutter or by release operation, the circuit controls the motor 11 to rotate in the direction of $F_1$ to advance the film 3 and to stop when the photosensor 4 detects the perforation 3d indicative of the next frame.

After all the frames have been exposed, the circuit controls the motor 11 to rotate in the direction of $R_1$ so that the first sun gear 102 is driven into rotation in the direction of $R_2$. This in turn allows the first planetary gear 106 to move into meshing engagement with the gear 111 so that the gear 111 rotates in the direction of $R_6$ causing the fork 32 to rotate to drive the cartridge spool 1 into rotation in the direction of $R_5$. Thus, the film 3 will be rewound into the cartridge 1. At the same time, the rotation of the gear 111 in the direction of $R_6$, driven by the first planetary gear 106, is transmitted to the gear 109 through the reduction gear 110 so that the gear 109 rotates in the direction of $R_3$. The gear 109, then, rotates clockwise relative to the gear 107 causing the one way clutch 108 to engage. This also causes the gear 107 to rotate in the direction of $R_3$, so that the second sun gear 115 rotates in the direction $R_4$ allowing the second planetary gear 119 move out of meshing engagement with the reduction gear 121. The pivotal motion of arm 117 is stopped when it abuts the limit pin 120 and then the second planetary gear 119 continues its free rotation. Thus, the spool 24 is free to rotate as the film 3 is rewound into the cartridge 1.

In this manner, when the entire film 3 has been accommodated in the cartridge 1, the photo sensor 4 stops outputting pulse signals each of which indicates the perforations 3d. Detecting no pulse signals from the sensor 4, the circuit controls the motor 11 to stop.

Figure 5:
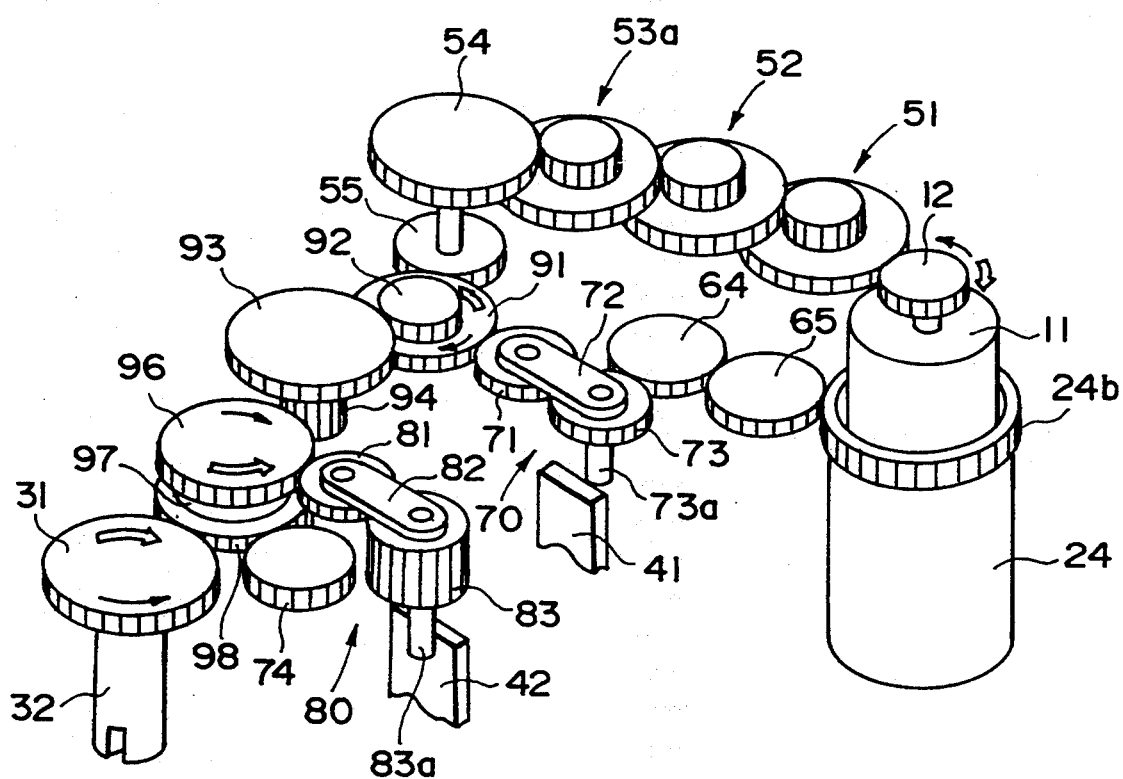
FIG. 5 is a perspective view of a fourth embodiment.

FIG. 5 shows apparatus of a fourth embodiment according to the present invention. Parts similar to those in FIG. 3 are denoted with the same numerals, and the distinctions between the two figures will be mainly described.

In FIG. 5, the gear 55 meshes with a gear 91, and the rotation of the gear 91 is transmitted to a clutch upper gear 96 through gears 92, 93 and 94. The clutch upper gear 96 is connected, through one way clutch 97, to a clutch lower gear 98 which meshes with a fork gear 31. In other words, in the above embodiment, the one way clutch 97 is provided in the closest proximity to the fork gear 31 among a gear train consisting of gears 12 to 55, 91 to 94, 96 and 98.

A planetary gear mechanism 70 consists of a sun gear 71 for meshing with the gear 91 and a planetary gear 73 which meshes with the sun gear 71 and is connected to the sun gear 71 through a planetary arm 72. The mechanism permits the planetary gear 73 to mesh with a gear 64. A stopper 41 can engage a projection 73a under the planetary gear 73, and controls the clockwise pivoting thereof by the engagement. Further, a planetary gear mechanism 80 consists of a sun gear 81 for meshing with the clutch upper gear 96 and a planetary gear 83 which meshes with the sun gear 81 and is connected to the sun gear 81 through a planetary arm 82. The mechanism permits the planetary gear 83 to mesh with a gear 74 for meshing with the clutch lower gear 98. A stopper 42 can engage a projection 83a under the planetary gear 83, and controls the counterclockwise pivoting thereof by the engagement.

Also in this embodiment, the gear ratio of each gear has been set so that the film feeding speed due to the rotation of a film take-up spool 24 is higher than the feeding-out speed by means of a fork 32.

The operation of the fourth embodiment will now be described.

Operation from feeding-out to take-up of film

When a camera is loaded with a film cartridge 1 (FIG. 1) and the back cover (not shown) is closed, motor 11 rotates forward in response thereto, and the rotation is transmitted to the clutch upper gear 96 through gears 12 to 55 and 91 to 94 to rotate the clutch upper gear 96 clockwise. Since the one way clutch 97 is connected at this time, the rotation of the clutch upper gear 97 rotates the clutch lower gear 98 in the same direction together, and the rotation is transmitted to the fork gear 31 to rotate the fork 32 counterclockwise, thereby feeding the film 3 out from the film cartridge 1. Further since the clockwise rotation of the clutch upper gear 96 rotates the sun gear 81 counterclockwise at this time, the planetary gear 83 does not mesh with the gear 74, but idles in a state in which the counterclockwise pivoting is inhibited by the stopper 42.

Since the clockwise rotation of the gear 91 rotates the sun gear 71 counterclockwise, the planetary gear 73 meshes with a gear 64 to rotate a film take-up spool 24 counterclockwise. Therefore, when the film 3, which has been fed out from the film cartridge 1, reaches the film take-up spool 24 as mentioned above, it is taken up faster than when it has been fed out.

Operation during Frame Feed

The operation of each gear during frame feed is the same as mentioned above. When the film 3 was fed out, it was loosely wound around the spool shaft 2 of the film cartridge 1 as mentioned above. Since, however, the film feeding speed due to the rotation of the film take-up spool 24 is higher than that due to the rotation of the fork 32, the film 3 is gradually tightly wound around the spool shaft 2 as the frame feed advances, and is completely tightly wound after a little while. During frame feed after the film 3 is tightly wound, the fork 32 will be rotated at a higher speed than the rotational speed by the motor 11 by means of the film 3 being drawn out by the film take-up spool 24, and therefore the difference in the rotational speed will be absorbed by the one way clutch 97 as mentioned above.

An idling torque occurs with the one way clutch 97 at this time. Since, however, the one way clutch 97 is provided in the closest proximity to the fork 32 in the embodiment, the above-mentioned idling torque is not amplified, but a load to be applied to the motor 11 from the spool shaft 2 of the film cartridge 1 through the film take-up spool 24 is controlled to a minimum, thereby preventing the film feeding speed from becoming slower in the latter half of the frame feed. Further although this idling torque applies a load to the motor 11 even through the above-mentioned gear train, the speed reduction ratio of the load becomes higher than in the conventional case because the one way clutch 97 is provided nearest to the fork gear 31 side, and the load to be applied to the motor 11 can be also controlled to a minimum in this case.

Operation during Rewinding

When photographing of all the frames of the film 3 is finished, the motor 11 is rotated clockwise to rotate the clutch upper gear counterclockwise through the gear train. Therefore, the one way clutch 97 is in a released state so that the driving force of the clutch upper gear 96 is not transmitted to the clutch lower gear 98 through the one way clutch 97. On the other hand, since the sun gear 81 is rotated clockwise, the planetary gear 83 meshes with the gear 74, and the rotation of the sun gear 81 rotates the clutch lower gear 98 counterclockwise through the planetary gear 83 and the gear 74.

Since the clutch lower gear 98 has somewhat more teeth than the clutch upper gear 96 as mentioned above, it rotates somewhat slower than the latter in the same direction, and the latter rotates relatively counterclockwise in relation to the former. Therefore, the one way clutch 97 remains released. Also at this time, the counterclockwise rotation of the gear 91 rotates the sun gear 71 clockwise, and the planetary gear 73 is thereby separated from the gear 64 to go into a state in which its movement is controlled by the stopper 41. Therefore, the film take-up spool 24 enters a freely rotatable state, and the rotation of the above-mentioned clutch lower gear 98 rotates the fork 32 clockwise through the fork gear 31 to rewind the film 3 into the film cartridge 1.

In accordance with a further feature of the invention, the difference in rotational speed of the clutch gears can be detected so as to ensure that the leading portion of the film 3 is wound off the cartridge by the spool 24. For example, after having detected a predetermined amount of advancement of the film 3 on the basis of the output (e.g., a signal of 20 pulses) of the encoder 34, the difference in rotational speed between the gears may be detected by the use of a photosensor or the like. In the third embodiment, the photosensor 4 may be arranged to provide the function of an encoder.

The one way clutches 27, 57, 97 and 108 are not limited to a cam-and-roller type, but may be a ratchet-based type.

The illustrative embodiments have been arranged so that the rotation of motor 11 is not transmitted to the spool 24 when rewinding, but these embodiments are only exemplary and the spool 24 may also be rotated so that the spool 24 advances the film 3 faster than the fork 32 rewinds the film 3. In which case, the film 3 wrapped around the spool 24 may be out of hooking engagement with the paws 24a when the film diameter becomes somewhat large and thereafter the spool 24 will rotate free from the film 3. Thus, the rewinding operation of the film 3 will be unaffected.

While the embodiments have been described with respect to the spool 24 provided with teeth 24a for engaging the perforations 3a, the film 3 may be wound off the cartridge between the spool and pressing rollers as disclosed in the Utility Model Publication No. 1-25938.

By the use of a simple construction in which a motor adapted to rotate in a forward as well as a reverse direction is combined with a rotation transmission system having a one way clutch mechanism, the aforementioned winding/rewinding apparatus of a camera ensures smooth and proper operation of the extruding the leading portion of film 3 from the cartridge 1, winding the leading portion around the spool 24, winding up the film after each frame exposure, and rewinding the film 3 into the cartridge.

We claim:

1. A winding/rewinding apparatus for a camera using a thrust-type film unit having a cartridge and a cartridge spool rotatable with respect to the cartridge to thrustingly feed out a film, comprising:
    a motor rotatable in forward and reverse directions;
    a rotatable rewinding shaft for engaging the cartridge spool to rotate the cartridge spool with respect to the cartridge;
    a winding spool rotatable to wind the film from the cartridge; and
    transmission means for transmitting forward rotational force of said motor to said rewinding shaft and to said winding spool such that said rewinding shaft rotates the cartridge spool with respect to the cartridge to thrustingly advance a portion of the film to said winding spool and said winding spool thereafter winds the film thereon, with the film winding speed of said winding spool being greater than the film advancing speed of said rewinding shaft;
    said transmission means including clutch means engaging for transmitting forward rotational force of said motor to said rewinding shaft, and disengaging in response to an increase in the rewinding shaft speed caused by the winding of the film by said winding spool for discontinuing the transmission of forward rotational force of said motor to said rewinding shaft when the film is being wound by said winding spool.

2. A winding/rewinding apparatus for a camera according to claim 1, wherein said transmission means further includes selector means for causing forward rotational force of said motor to be transmitted through said clutch means to said rewinding shaft to rotate said rewinding shaft in a forward direction and thereby advance said portion of the said portion of the film from the cartridge, and for causing reverse rotational force of said motor to be transmitted to said rewinding shaft to rotate said rewinding shaft in a reverse direction and thereby rewind the film into the cartridge.

3. A winding/rewinding apparatus for a camera according to claim 2, wherein said clutch means includes a first rotating member, a second rotating member drivingly connected to said rewinding shaft, and a one-way clutch provided between the first and second rotating members, said selector means selectively transmitting forward rotational force of said motor to said first rotating member and reverse rotational force of said motor to said second rotating member.

4. A winding/rewinding apparatus for a camera according to claim 3, wherein said selector means couples said motor to said first rotating member when said motor rotates in a forward direction, and couples said motor to said second rotating member when said motor rotates in a reverse direction.

5. A winding/rewinding apparatus for a camera according to claim 2, wherein said clutch means includes:
    a first rotating member;
    a second rotating member drivingly connected to said rewinding shaft;
    a one way clutch provided between said first and second rotating members; wherein said selector means couples said motor to said first rotating member and to said winding spool in response to the rotation of said motor in a forward direction, and coupling said motor to said rewinding shaft in response to rotation of said motor in a reverse direction.

6. A winding/rewinding apparatus for a camera according to claim 7, wherein said selector means includes first selector means for coupling said motor to said first rotating member and said rewinding shaft, selectively, and second selector means for selectively coupling and uncoupling said first rotating member and said winding spool.

7. A winding/rewinding apparatus for a camera according to claim 1, wherein said clutch means includes:
    a first rotating member drivingly connected to said motor;
    a second rotating member drivingly connected to said rewinding shaft; and
    a one-way clutch provided between said first and second rotating members; and
    wherein said apparatus further comprises selector means for selectively coupling said first rotating member to said winding spool to transmit forward rotational force of said motor to said winding spool and coupling said first rotating member to said second rotating member to transmit reverse rotational force of said motor to said rewinding shaft.

8. A winding/rewinding apparatus for a camera according to claim 7, wherein said selector means couples said first rotating member to said winding spool in response to rotation of said first rotating member in a first direction by forward rotation of said motor, and couples said first rotating member to said second rotating member in response to rotation of said first rotating member in a second direction by reverse rotation of said motor.

9. A winding/rewinding apparatus for a camera according to claim 1, wherein said clutch means is provided in the proximity of said rewinding shaft.

10. A winding/rewinding apparatus for a camera according to claim 9, wherein said clutch means is provided at a position in which said clutch means directly drives said rewinding shaft.

11. A winding/rewinding apparatus for a camera according to claim 1, wherein said transmission means includes selector means changeable between a first state for transmitting forward rotational force of said motor to said winding spool causing winding of the film, and a second state for transmitting reverse rotational force of said motor to said rewinding shaft causing rewinding of the film.

12. A winding/rewinding apparatus for a camera according to claim 1, wherein said selector means assumes said first and second states, selectively, in accordance with the direction of rotation of said motor.

13. A winding/rewinding apparatus for a camera according to claim 1, wherein said transmission means further includes selector means changeable between a first state for permitting forward rotational force of said motor to be transmitted to said rewinding shaft through said clutch means in order to advance said portion of the film from the cartridge, and a second state for transmitting reverse rotational force of said motor to said rewinding shaft in order to rewind the film into the cartridge.

14. A winding/rewinding apparatus for a camera according to claim 13, wherein said selector means assumes said first and second states, selectively, in accordance with the direction of rotation of said motor.

15. A method of transporting a film in a camera using a thrust-type film unit having a cartridge and a cartridge spool rotatable with respect to the cartridge to thrustingly feed out a film, comprising the steps of:
providing a film transport mechanism including a motor, a rotatable rewinding shaft for engaging the cartridge spool to rotate the cartridge spool with respect to the cartridge, a winding spool rotatable to wind the film from the cartridge, and a transmission mechanism for drivingly connecting the motor to the rewinding shaft and the winding spool;
forwardly rotating the motor;
transmitting forward rotational force of the motor through the transmission mechanism to the rewinding shaft and to the winding spool such that the rewinding shaft rotates the cartridge spool with respect to the cartridge to thrustingly advance a portion of the film to the winding spool and the winding spool thereafter winds the film thereon, with the film winding speed of the winding spool being greater than the film advancing speed of the rewinding shaft; and
discontinuing the transmission of forward rotational force from the motor to the rewinding shaft in response to an increase in the rewinding shaft speed caused by the winding of the film by said winding spool.

16. A winding/rewinding apparatus for a camera using a thrust-type film unit having a cartridge and a cartridge spool rotatable with respect to the cartridge to thrustingly feed out a film, comprising:
a motor rotatable in forward and reverse directions;
a rotatable rewinding shaft for engaging the cartridge spool to rotate the cartridge spool with respect to the cartridge;
a winding spool rotatable to wind the film from the cartridge; and
a transmission mechanism for transmitting forward rotational force of said motor to said rewinding shaft and to said winding spool such that said rewinding shaft rotates the cartridge spool with respect to the cartridge to thrustingly advance a portion of the film to said winding spool and said winding spool thereafter winds the film thereon, with the film winding speed of said winding spool being greater than the film advancing speed of said rewinding shaft;
said transmission mechanism including a clutch engaging for transmitting forward rotational force of said motor to said rewinding shaft, and disengaging in response to an increase in the rewinding shaft speed caused by the winding of the film by said winding spool for discontinuing the transmission of forward rotational force of said motor to said rewinding shaft when the film is being wound by said winding spool.

17. A winding/rewinding apparatus for winding/rewinding a film in a thrust-type film unit having a cartridge and a cartridge spool rotatable with respect to the cartridge to thrustingly feed out the film, comprising:
a motor rotatable in forward and reverse directions;
a rotatable rewinding shaft for engaging the cartridge spool to rotate the cartridge spool with respect to the cartridge;
a winding spool rotatable to wind the film from the cartridge; and
a transmission mechanism for transmitting forward rotational force of said motor to said rewinding shaft and to said winding spool such that said rewinding shaft rotates the cartridge spool with respect to the cartridge to thrustingly advance a portion of the film to said winding spool and said winding spool thereafter winds the film thereon, with the film winding speed of said winding spool being greater than the film advancing speed of said rewinding shaft;
said transmission mechanism including a clutch engaging for transmitting forward rotational force of said motor to said rewinding shaft, and disengaging in response to an increase in the rewinding shaft speed caused by the winding of the film by said winding spool for discontinuing the transmission of forward rotational force of said motor to said rewinding shaft when the film is being wound by said winding spool.

* * * * *